F. A. MORLEY.
Potato-Digger.
No. 55,206. Patented May 29. 1866.
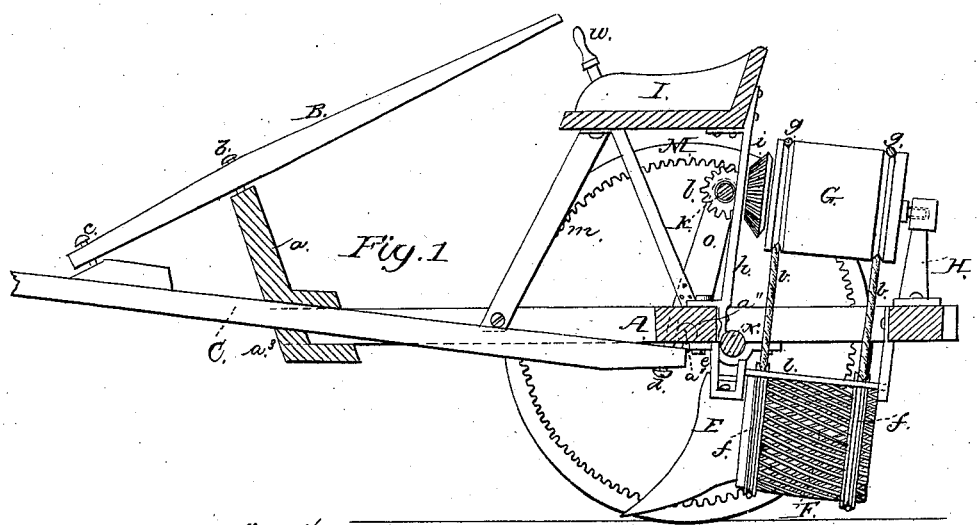
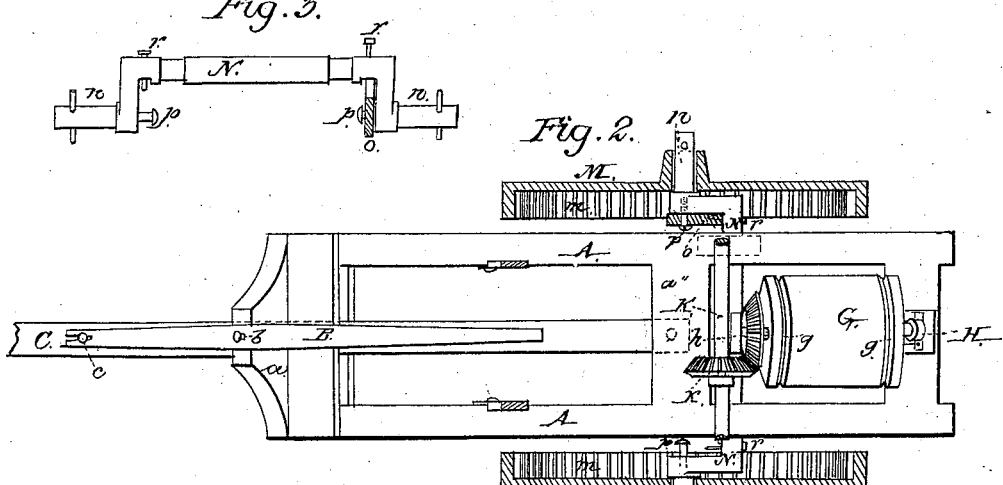
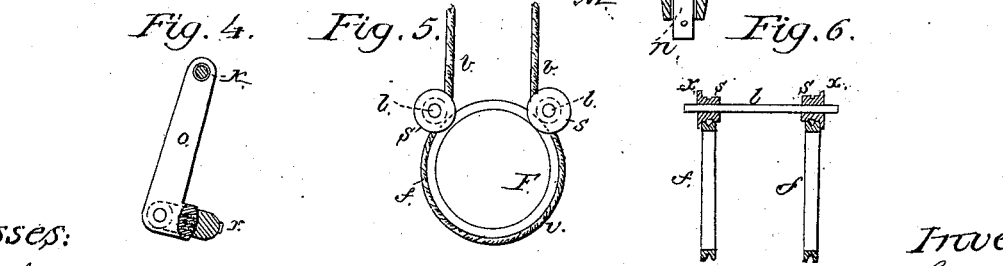
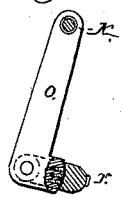
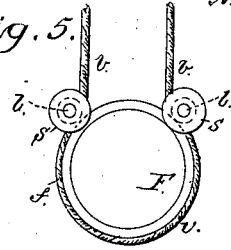
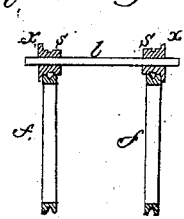
Witnesses:
Gustave Dietrich
Geo. H. Strong
Inventor:
F. A. Morley

UNITED STATES PATENT OFFICE.

F. A. MORLEY, OF NEW YORK, ASSIGNOR TO HIMSELF AND J. W. MOUNT, OF MEDINA, N. Y.

IMPROVEMENT IN POTATO-DIGGERS.

Specification forming part of Letters Patent No. 55,206, dated May 29, 1866.

*To all whom it may concern:*

Be it known that I, F. A. MORLEY, of the city, county, and State of New York, have invented a new and Improved Potato-Digger; and I do hereby declare that the following is a full, clear, and exact description thereof, which will enable those skilled in the art to make and use the same, reference being had to the accompanying drawings, forming part of this specification.

This invention relates to new and useful improvements in potato-digging machines; and the invention consists in a frame-work mounted on wheels and having a digging-shovel rigidly attached thereto, the said frame-work of the vehicle being supported on a crooked or crank axle for elevating the digger by elevating the frame-work, and the wheels of the vehicle acting as driving-wheels to drive a cylindrical screen, which is suspended and driven in a novel manner; also, in a novel manner of regulating the depth of the digging; also, in the mode of attaching the vehicle to the draft-pole, and in employing, in connection therewith, a guiding-lever to aid in guiding the machine accurately along the drills, as hereinafter explained.

Figure 1 in the accompanying drawings is a vertical longitudinal section. Fig. 2 is a horizontal section, and Figs. 3, 4, 5, and 6 are detail views.

Similar letters of reference in the different figures indicate corresponding parts.

A, Figs. 1 and 2, is a frame-work, which is supported on the wheels M. The said wheels are each provided with a spur-gear, $m$, which engages with and drives a transverse shaft, K, by means of pinions $l$, Fig. 1, the said shaft K having a bevel-gear, $k$, Fig. 2, which engages with a bevel-gear, $j$, to drive a drum, G, the said drum G driving a cylindrical screen, F, Fig. 1, by means of a cord or chain-belts, $v\ v$, (red lines.)

E, Fig. 1, is the digger or shovel, which is secured to the frame-work of the vehicle in a fixed manner by straps $e$. The driving-belts $v\ v$ travel in V-grooves $g\ g$ in the drum G and in V-grooves $ff$ on the exterior of the cylindrical screen F, Fig. 1.

The axle N is of a crank form at each end, so that by turning the axle by means of a lever, $w$, Fig. 1, the frame-work A of the vehicle is raised or depressed, and the shovel E, being fixed to the said frame A, the said crank-axle N $n\ n$ and the lever $w$ serve to raise the shovel out of the ground when desirable. The upright standards $o$, Fig. 1, which support the pinion-shaft K, are also fixed to the crank ends of the axle N, so that when the lever $w$, Fig. 1, is thrown forward to elevate the shovel out of the ground, the shaft K is also carried forward and the bevel-wheel $k$ is thereby thrown out of connection with the gear $j$, and, consequently, whenever the shovel is raised out of the ground the screen-driving devices are thrown out of gear and the rotation of the cylindrical screen F is suspended until the shovel is again lowered, when the gears $k\ j$ again engage and the revolving screen F is immediately set in motion.

The draft pole or tongue C is connected to the machine by a pivot, $d$, Fig. 1, near the center of the vehicle, and the tongue leads out through a transverse slot, $a^3$, Fig. 1, in the front part of the frame, so that the tongue C is free to play laterally in the front of the machine and to turn on the pivot $d$, and in connection with the pivoted tongue C is a hand-lever B, which is pivoted to the frame-work at $b$ and takes hold of the tongue at $c$, and by the means of this lever B the driver, occupying the seat I, may change the direction of the frame A or vehicle with relation to the tongue C.

The standards $o$, Fig. 1, are fixed on the axle N in an adjustable manner (see Fig. 4) by means of set-screws $r\ r$, Figs. 2, 3, and 4, so that their rotative position on the axle N may be changed and the bevel driving-gears $k\ j$, Fig. 2, brought into engagement sooner or later with relation to the shovel-elevating devices and the depth of the digging regulated thereby.

The rotating screen F, Fig. 1, is centerless— that is to say, it is entirely open through its center and free from obstructions, as shown by end view of screen F, Fig. 5, and the screen is suspended by the belts $v\ v$, Figs. 1 and 5, and is held steady in its position by the rollers $s\ s$, Figs. 5 and 6, the said rollers having small flanges $x\ x$, Fig. 6, which hold the screen from longitudinal displacement.

Fig. 5 shows the arrangement of steadying-rollers and suspending-belts $v$, by which the open cylindrical screen F is held in place. The screen F being entirely open through its center, the vines pass through freely and find no obstructions upon which they can lodge and choke the screen.

The shovel E, Fig. 1, is made in the form of a ring at its rear end, and the forward end of the screen laps over on the outside of the ring or fits close up to it, so that a sufficiently-close joint is made and still the parts left free and clear of each other to avoid friction between the rotating screen and the shovel.

By pivoting the vehicle to the tongue C and using the lever B to aid in guiding the digger the line of drills can be followed much closer than when steering the machine by the direction of the draft-animals alone, and consequently by these means a narrower shovel can be used and less dirt taken up to unearth all of the tubers.

In digging the dirt is pushed through the shovel into the revolving screen and the dirt is sifted through the screen and the potatoes and vines are discharged from the rear end of the screen and left upon the surface of the ground.

Having thus described my invention, what I claim as new, and desire to secure by Letters Patent, is—

1. A rotating cylindrical screen, F, entirely open through its center and free from obstructions, in combination with the digger or shovel E, substantially in the manner and for the purpose set forth.

2. The combination of the shovel E, frame A, and crank-axle N, substantially in the manner and for the purpose described.

3. The standards o, having relative adjustment on the crank-axle N to regulate the depth of digging, substantially in the manner and for the purpose specified.

4. The combination of the shovel E, frame A, and pivoted draft-pole C, substantially in the manner and for the purpose set forth.

F. A. MORLEY.

Witnesses:
    GUSTAVE DIETERICH,
    GEO. H. STRONG.